(12) United States Patent
Morioka et al.

(10) Patent No.: US 11,729,705 B2
(45) Date of Patent: Aug. 15, 2023

(54) WIRELESS COMMUNICATION APPARATUS AND WIRELESS COMMUNICATION METHOD

(71) Applicant: SONY GROUP CORPORATION, Tokyo (JP)

(72) Inventors: Yuichi Morioka, Kanagawa (JP); Ryuichi Hirata, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/871,284

(22) Filed: Jul. 22, 2022

(65) Prior Publication Data

US 2022/0361090 A1  Nov. 10, 2022

Related U.S. Application Data

(63) Continuation of application No. 17/042,375, filed as application No. PCT/JP2019/011985 on Mar. 22, 2019, now Pat. No. 11,425,629.

(30) Foreign Application Priority Data

Apr. 6, 2018  (JP) ................................ 2018-073927

(51) Int. Cl.
  *H04W 48/10* (2009.01)
  *H04W 48/16* (2009.01)
  (Continued)

(52) U.S. Cl.
  CPC ........... *H04W 48/10* (2013.01); *H04W 48/16* (2013.01); *H04W 52/46* (2013.01); *H04W 84/12* (2013.01)

(58) Field of Classification Search
  CPC .............................. H04W 48/10; H04W 48/12
  (Continued)

(56) References Cited

U.S. PATENT DOCUMENTS

2006/0223574 A1  10/2006 Chandra
2008/0080436 A1*  4/2008 Sandhu ............... H04W 52/241
                                                    370/328

(Continued)

FOREIGN PATENT DOCUMENTS

BR         PI0612324 A2    11/2010
BR     112015007108 A2     7/2017
(Continued)

OTHER PUBLICATIONS

Extended European Search Report of EP Application No. 19781967.5, dated May 3, 2021, 11 pages.
(Continued)

*Primary Examiner* — Qutbuddin Ghulamali
(74) *Attorney, Agent, or Firm* — Chip Law Group

(57) ABSTRACT

The technology relates to a wireless communication apparatus and a wireless communication method for enabling a wireless terminal station to easily select an appropriate connection destination from among a plurality of wireless base stations. A first wireless communication apparatus includes a communication section configured to transmit to a wireless terminal station a broadcast signal including network connection information regarding a wireless communication system having a plurality of base stations communicating with each other, the first wireless communication apparatus functioning as one of the plurality of wireless base stations. A second wireless communication apparatus includes a communication section to receive a broadcast signal including network connection information regarding a wireless communication system, from a plurality of wireless base stations constituting the wireless communication system and communicating with one another, the second wireless communication apparatus functioning as a wireless terminal station.

19 Claims, 14 Drawing Sheets

(51) Int. Cl.
*H04W 52/46* (2009.01)
*H04W 84/12* (2009.01)

(58) Field of Classification Search
USPC .......................................................... 455/434
See application file for complete search history.

(56) References Cited

U.S. PATENT DOCUMENTS

| | | | |
|---|---|---|---|
| 2009/0264123 | A1 | 10/2009 | Agashe et al. |
| 2010/0330914 | A1 | 12/2010 | Chandra |
| 2013/0051328 | A1 | 2/2013 | Chandra |
| 2013/0142136 | A1* | 6/2013 | Pi ...................... H04W 28/0289 370/329 |
| 2015/0208416 | A1 | 7/2015 | Chandra |
| 2015/0230275 | A1* | 8/2015 | Kerpez ................ H04W 72/52 370/329 |
| 2015/0289201 | A1* | 10/2015 | Stupar .................... H04L 43/12 370/338 |
| 2017/0208574 | A1* | 7/2017 | Ramakrishna ........ H04L 5/0092 |
| 2017/0215140 | A1 | 7/2017 | Stupar et al. |
| 2020/0045615 | A1* | 2/2020 | Karimli ................ H04W 24/02 |

FOREIGN PATENT DOCUMENTS

| | | |
|---|---|---|
| CA | 2603211 A1 | 10/2006 |
| CA | 2886147 A1 | 4/2014 |
| CN | 101517980 A | 8/2009 |
| CN | 102017722 A | 4/2011 |
| CN | 102123481 A | 7/2011 |
| CN | 104769895 A | 7/2015 |
| CN | 106165498 A | 11/2016 |
| CN | 108702199 A | 10/2018 |
| CN | 110049536 A | 7/2019 |
| EP | 1867142 A2 | 12/2007 |
| EP | 2067311 A1 | 6/2009 |
| EP | 2283679 A1 | 2/2011 |
| EP | 2769482 A1 | 8/2014 |
| EP | 2901632 A1 | 8/2015 |
| EP | 3130179 A2 | 2/2017 |
| EP | 3403340 A1 | 11/2018 |
| ES | 2673122 T3 | 6/2018 |
| GE | P20125611 B | 8/2012 |
| JP | 2008-535398 A | 8/2008 |
| JP | 2010-501140 A | 1/2010 |
| JP | 2011-518529 A | 6/2011 |
| JP | 4754624 B2 | 8/2011 |
| JP | 5974226 B2 | 8/2016 |
| JP | 2017-017482 A | 1/2017 |
| JP | 2017-514373 A | 6/2017 |
| KR | 200420221 Y1 | 6/2006 |
| KR | 10-2011-0007610 A | 1/2011 |
| KR | 10-2012-0120488 A | 11/2012 |
| KR | 10-2013-0023296 A | 3/2013 |
| KR | 10-2013-0137572 A | 12/2013 |
| KR | 10-2014-0094556 A | 7/2014 |
| KR | 10-2014-0103891 A | 8/2014 |
| KR | 10-2015-0054971 A | 5/2015 |
| KR | 10-2016-0141816 A | 12/2016 |
| KR | 10-2017-0085436 A | 7/2017 |
| TW | M297103 U | 9/2006 |
| TW | 201004456 A | 1/2010 |
| TW | 201338611 A | 9/2013 |
| TW | 201342977 A | 10/2013 |
| TW | I433582 B | 4/2014 |
| WO | 2006/107698 A2 | 10/2006 |
| WO | 2008/042192 A1 | 4/2008 |
| WO | 2009/131898 A1 | 10/2009 |
| WO | 2013/058607 A1 | 4/2013 |
| WO | 2014/051630 A1 | 4/2014 |
| WO | 2015/157039 A2 | 10/2015 |
| WO | 2017/122977 A1 | 7/2017 |

OTHER PUBLICATIONS

International Search Report and Written Opinion of PCT Application No. PCT/JP2019/011985, dated Apr. 23, 2019, 13 pages of English Translation and 10 pages of ISRWO.

International Preliminary Report on Patentability of PCT Application No. PCT/JP2019/011985, dated Oct. 15, 2020, 13 pages of English Translation and 07 pages of IPRP.

Non-Final Office Action for U.S. Appl. No. 17/042,375, dated Dec. 8, 2021, 15 pages.

Notice of Allowance for U.S. Appl. No. 17/042,375, dated Apr. 19, 2022, 08 pages.

* cited by examiner

WIRELESS COMMUNICATION APPARATUS AND WIRELESS COMMUNICATION METHOD

CROSS REFERENCE TO RELATED APPLICATIONS

This application is a continuation application of U.S. patent application Ser. No. 17/042,375, filed on Sep. 28, 2020, which is a U.S. National Phase of International Patent Application No. PCT/JP2019/011985, filed on Mar. 23, 2019, which claims priority benefit of Japanese Patent Application No. JP 2018-073927 filed in the Japan Patent Office on Apr. 6, 2018. Each of the above-referenced applications is hereby incorporated herein by reference in its entirety.

TECHNICAL FIELD

The present technology relates to a wireless communication apparatus and a wireless communication method. More particularly, the technology relates to a wireless communication apparatus and a wireless communication method used advantageously to perform wireless communication by employing a plurality of wireless base stations (access points).

BACKGROUND ART

Heretofore, for wireless communication systems that include a plurality of multi-band APs (Access Points) and multi-band WTRUs (Wireless Transmit/Receive Units), it has been disclosed that frequency band information including quality indicator information covering path loss, load, throughput, capacitance, and backhaul with respect to each frequency band is broadcast by beacon frame. It has also been disclosed that the multi-band WTRU selects a multi-band AP and a frequency band to associate with on the basis of the frequency band information (e.g., see PTL 1).

CITATION LIST

Patent Literature

[PTL 1]
JP-T-2008-535398

SUMMARY

Technical Problem

However, the above-cited PTL 1 does not specify, for example, what the backhaul information included in the quality indicator information contains or how an appropriate multi-band AP is selected on the basis of the backhaul information.

The present technology has been devised in view of the above circumstances and aims at allowing a wireless terminal station to easily select an appropriate connection destination from among a plurality of wireless base stations.

Solution to Problem

According to a first aspect of the present technology, there is provided a wireless communication apparatus including a communication section configured to transmit to a wireless terminal station a broadcast signal including network connection information regarding a wireless communication system having a plurality of wireless base stations communicating with one another, in which the wireless communication apparatus functions as one of the plurality of wireless base stations.

Also, according to the first aspect of the present technology, there is provided a wireless communication method for use with a wireless communication apparatus, the method including: causing the wireless communication apparatus to transmit to a wireless terminal station a broadcast signal including network connection information regarding a wireless communication system having a plurality of wireless base stations communicating with one another; and allowing the wireless communication apparatus to function as one of the plurality of wireless base stations.

According to a second aspect of the present technology, there is provided a wireless communication apparatus including a communication section configured to receive a broadcast signal including network connection information regarding a wireless communication system, from a plurality of wireless base stations constituting the wireless communication system and communicating with one another, in which the wireless communication apparatus functions as a wireless terminal station.

According to the first aspect of the present technology, a broadcast signal including network connection information regarding a wireless communication system having a plurality of wireless base stations communicating with one another is transmitted to a wireless terminal station.

According to the second aspect of the present technology, a broadcast signal including network connection information regarding a wireless communication system is received from a plurality of wireless base stations constituting the wireless communication system and communicating with the plurality of wireless base stations.

Advantageous Effect of Invention

Thus, according to the first or the second aspect of the present technology, a wireless terminal station is enabled to easily select an appropriate connection destination from among a plurality of wireless base stations.

The advantageous effect outlined above is not limitative of the present disclosure. Further advantages will become apparent from a reading of the present disclosure.

DESCRIPTION OF EMBODIMENTS

Some embodiments for implementing the present technology are described below. The description will be given under the following headings:
 1. Embodiment
 2. Modified examples
 3. Others 1. Embodiment The present technology involves, for a wireless communication system in accordance with the IEEE 802.11 (wireless LAN) standard, for example, allowing a plurality of wireless base stations to communicate with each other and enabling a wireless terminal station to select an appropriate connection destination from among a plurality of the wireless base stations in such a manner as to maximize the utilization efficiency of frequency resources.

In the description that follows, the wireless base station will be referred to as the access point (AP) and the wireless terminal station as the station (STA).

<Configuration Example of Wireless Communication Apparatus 101>

Figure 1:
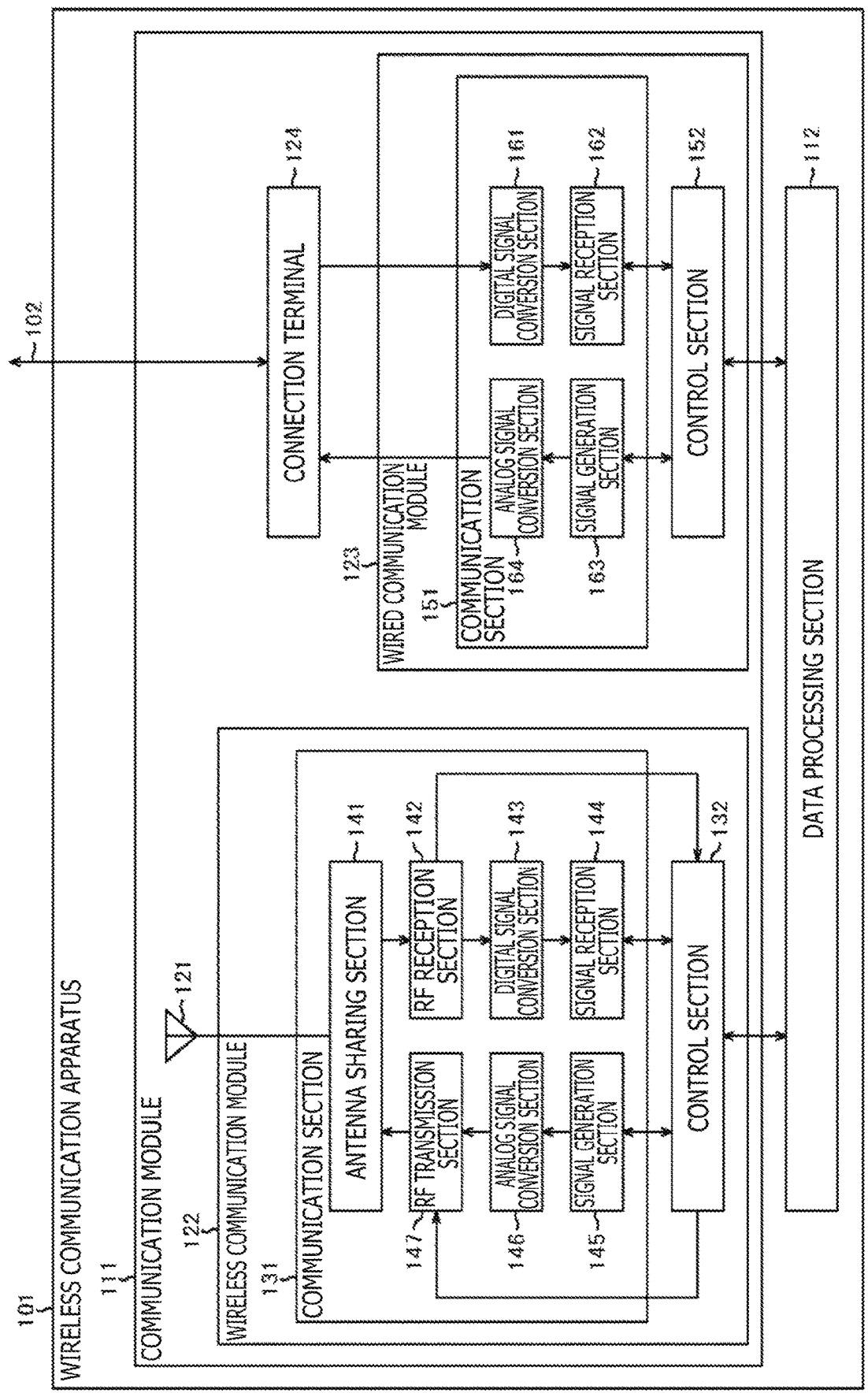
FIG. 1 is a block diagram depicting a configuration example of a wireless communication apparatus (direct access point) to which the present technology is applied.

FIG. 1 is a block diagram depicting a configuration example of a wireless communication apparatus 101 to which the present technology is applied.

The wireless communication apparatus 101 functions as an access point that connects to a trunk line communication network (not depicted) such as the Internet via a wired backhaul 102. The wireless communication apparatus 101 communicates with other servers (not depicted) via the backhaul 102 and the trunk line communication network, and performs wireless communication with another access point and another station.

The wireless communication apparatus 101 includes a communication module 111 and a data processing section 112.

The communication module 111 connects to the trunk line communication network via the backhaul 102, and communicates with servers via the backhaul 102 and the trunk line communication network. The communication module 111 also communicates wirelessly with another access point and another station.

The data processing section 112 extracts various kinds of information from signals supplied from the communication module 111. The data processing section 112 sends the extracted information and generated information to the communication module 111.

The communication module 111 includes an antenna 121, a wireless communication module 122, a wired communication module 123, and a connection terminal 124.

The antenna 121 wirelessly transmits various signals supplied from the wireless communication module 122. Further, the antenna 121 receives wirelessly transmitted signals and sends the received signals to the wireless communication module 122.

The wireless communication module 122 includes a semiconductor chip, for example. While exchanging information with the data processing section 112 as needed, the wireless communication module 122 sends various signals to the antenna 121 to have the signals transmitted from the antenna 121, and performs the processes corresponding to the signals received by the antenna 121.

The wireless communication module 122 includes a communication section 131 and a control section 132.

Under control of the control section 132, the communication section 131 communicates wirelessly with another access point and another station via the antenna 121.

The control section 132 controls the operation of the wireless communication module 122 as a whole. For example, the control section 132 supplies the data processing section 112 with the signal sent from the communication section 131, and supplies the communication section 131 with the information sent from the data processing section 112. In another example, the control section 132 controls the communication section 131 (an RF transmission section 147 therein) to regulate the intensity of signals transmitted from the antenna 121.

The communication section 131 includes an antenna sharing section 141, an RF reception section 142, a digital signal conversion section 143, a signal reception section 144, a signal generation section 145, an analog signal conversion section 146, and the RF transmission section 147.

The antenna sharing section 141 is a switch that performs a switching between transmission and reception. That is, the antenna sharing section 141 supplies the antenna 121 with signals sent from the RF transmission section 147, and supplies the RF reception section 142 with signals sent from the antenna 121.

The RF reception section 142 includes a low-noise amplifier, an AGC (Auto Gain Control) section, a frequency converter, and a filter, for example. The RF reception section 142 receives signals from the antenna 121 via the antenna sharing section 141. The RF reception section 142 then performs various processes such as amplification, gain adjustment, frequency conversion, and filtering on the received signal as needed, and sends the signal resulting from the processing to the digital signal conversion section 143. The RF reception section 142 obtains the reception intensity of the received signal as needed and sends what is obtained to the control section 132.

The digital signal conversion section 143 subjects the signal supplied from the RF reception section 142 to AD (Analog Digital) conversion for conversion from analog to digital form, and sends the converted signal to the signal reception section 144.

Under control of the control section 132, the signal reception section 144 performs various processes such as demodulation and decoding on the signal supplied from the digital signal conversion section 143, and sends the signal resulting from the processing to the control section 132.

The signal generation section 145 performs an encoding process on the basis of information supplied from the control section 132 to generate a signal in a predetermined format, carries out a modulation process on the generated signal, and sends the modulated signal to the analog signal conversion section 146.

The analog signal conversion section 146 subjects the signal supplied from the signal generation section 145 to DA (Digital Analog) conversion for conversion from digital to analog form, and sends the converted signal to the RF transmission section 147.

The RF transmission section 147 includes a frequency converter, an amplifier, and a filter, for example. The RF transmission section 147 performs such processes as frequency conversion, amplification, and filtering on the signal supplied from the analog signal conversion section 146. The RF transmission section 147 sends the processed signal to the antenna 121 via the antenna sharing section 141 to have the signal transmitted from the antenna 121.

The wired communication module 123 includes a semiconductor chip, for example. The wired communication module 123 connects to the trunk line communication network via the connection terminal 124 and the backhaul 102. While exchanging information with the data processing section 112 as needed, the wired communication module 123 transmits various signals to servers via the connection terminal 124, the backhaul 102, and the trunk line communication network, and performs the processes corresponding to the signals received from the servers.

The wired communication module 123 includes a communication section 151 and a control section 152.

Under control of the control section 152, the communication section 151 connects to the trunk line communication network via the connection terminal 124 and the backhaul 102, and communicates with the servers via the trunk line communication network.

The control section 152 controls the operation of the wired communication module 123 as a whole. Also, the control section 152 supplies the data processing section 112 with the signal sent from the communication section 151, and supplies the communication section 151 with the information sent from the data processing section 112.

The communication section 151 includes a digital signal conversion section 161, a signal reception section 162, a signal generation section 163, and an analog signal conversion section 164.

The digital signal conversion section 161 subjects the signal received via the backhaul 102 and the connection terminal 124 to AD (Analog Digital) conversion for conversion from analog to digital form, and sends the converted signal to the signal reception section 162.

Under control of the control section 152, the signal reception section 162 performs various processes such as demodulation and decoding on the signal supplied from the digital signal conversion section 153, and sends the signal resulting from the processing to the control section 152.

The signal generation section 163 performs an encoding process on the basis of information supplied from the control section 152 to generate a signal in a predetermined format, performs a modulation process on the signal thus generated, and sends the modulated signal to the analog signal conversion section 164.

The analog signal conversion section 164 subjects the signal supplied from the signal generation section 163 to DA (Digital Analog) conversion for conversion from digital to analog form, and outputs the converted signal to the backhaul 102 via the connection terminal 124.

<Configuration Example of Wireless Communication Apparatus 201>

Figure 2:
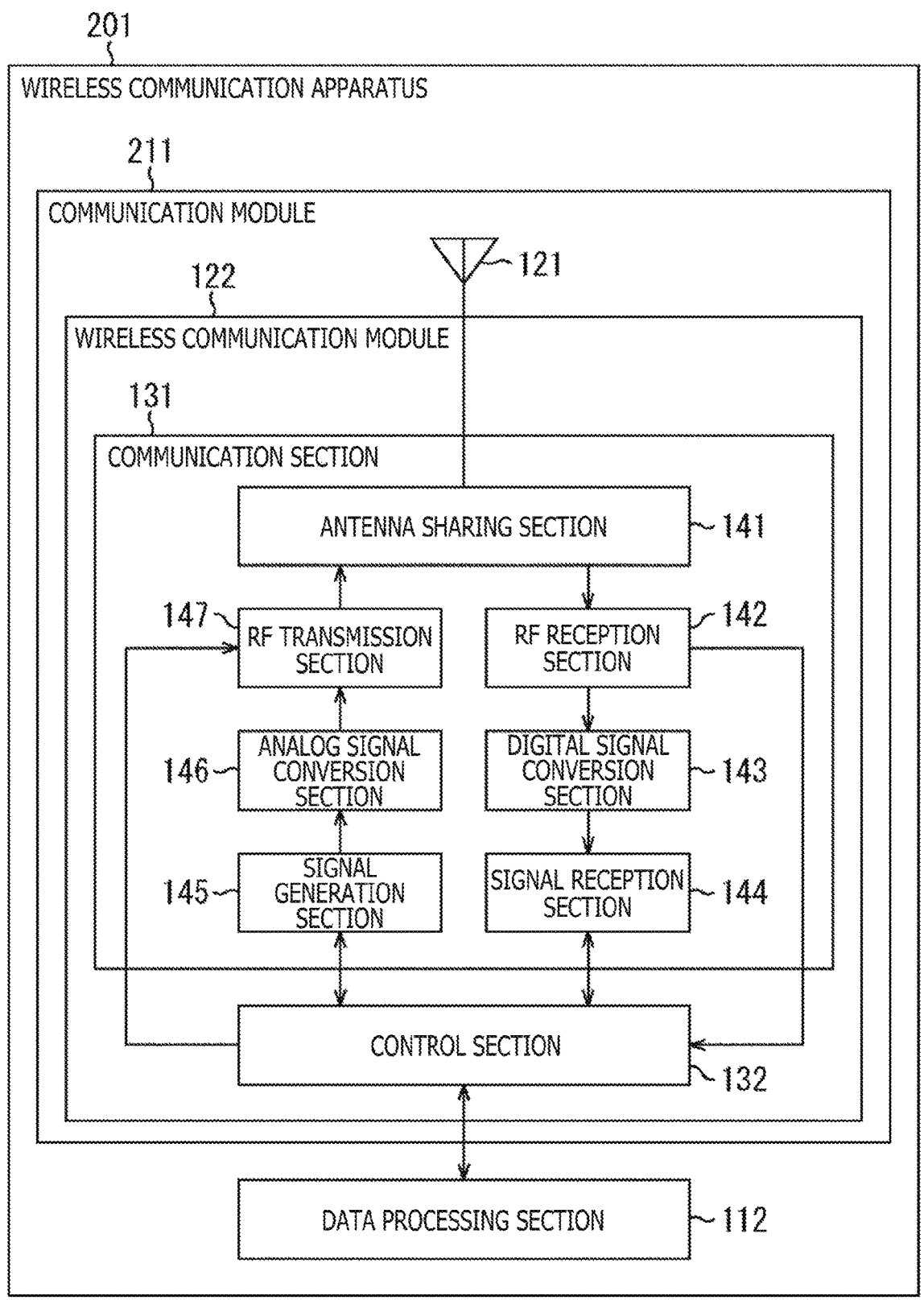
FIG. 2 is a block diagram depicting a configuration example of a wireless communication apparatus (indirect access point) to which the present technology is applied.

FIG. 2 is a block diagram depicting a configuration example of a wireless communication apparatus 201 to which the present technology is applied. In FIG. 2, the components corresponding to those of the wireless communication apparatus 101 in FIG. 1 are designated by like reference numerals, and explanation of the corresponding components is omitted hereunder where appropriate.

The wireless communication apparatus 201 functions as an access point that connects to the trunk line communication network via another access point and the backhaul 102. Also, the wireless communication apparatus 201 communicates wirelessly with another access point and another station.

The wireless communication apparatus 201 is configured such that the wired communication module 123 and the connection terminal 124 are removed from the wireless communication apparatus 101.

Specifically, the wireless communication apparatus 201 is different from the wireless communication apparatus 101 in that a communication module 211 is provided to replace the communication module 111. The communication module 211 is different from the communication module 111 in that the wired communication module 123 and the connection terminal 124 are removed.

Different from the wireless communication apparatus 101, the wireless communication apparatus 201 is connected with a wirelessly operating backhaul (referred to as the wireless backhaul hereunder) for connection to a wire-based backhaul (referred to as the wired backhaul hereunder) via another access point (the wireless communication apparatus 101).

In the description that follows, the access point connected directly with the wired backhaul like the wireless communication apparatus 101 will be referred to as the direct access point. Further, the access point connected with the wireless backhaul like the wireless communication apparatus 201 for connection to the wired backhaul via another access point will be referred to as the indirect access point.

<Configuration Example of Wireless Communication Apparatus 301>

Figure 3:
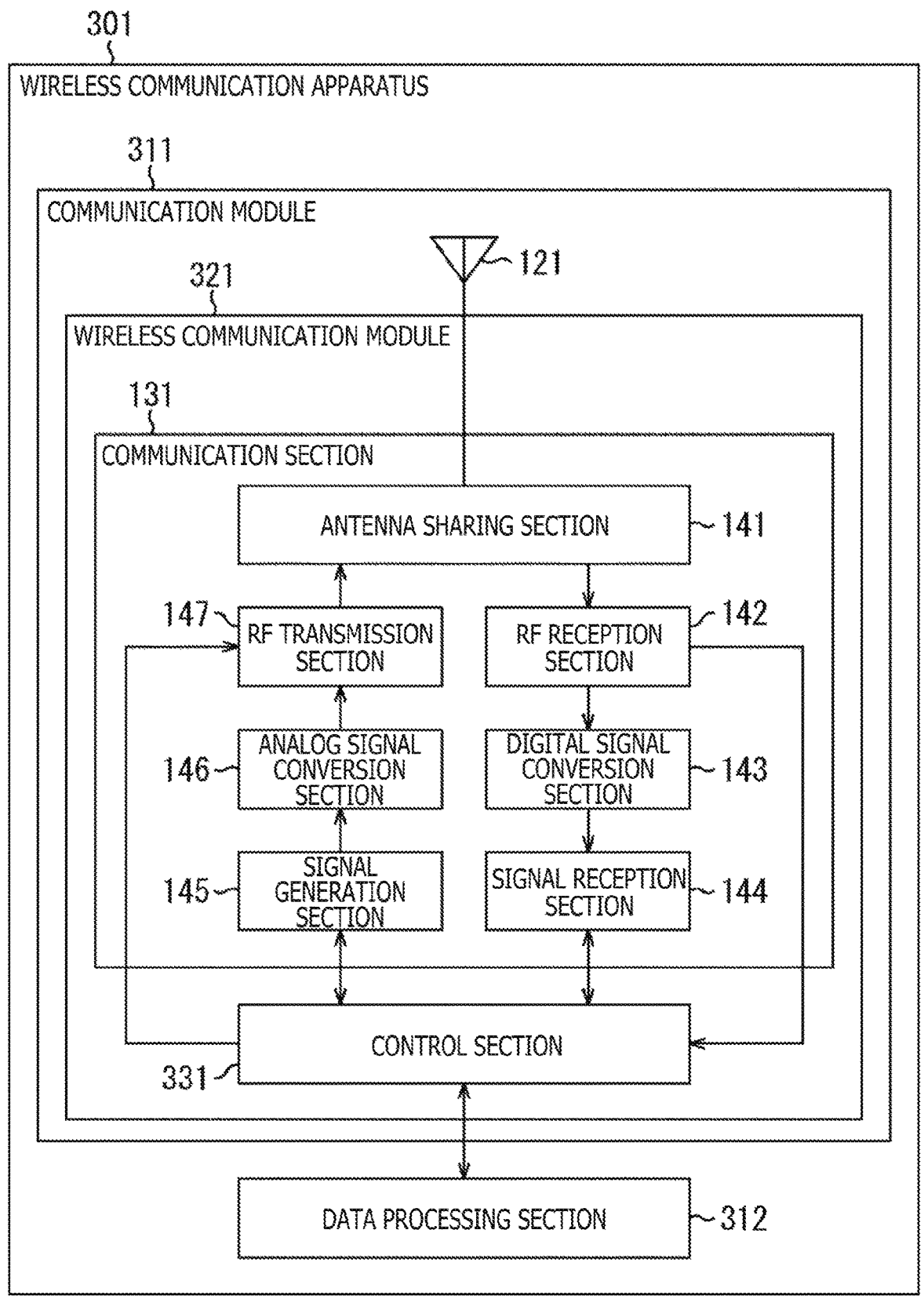
FIG. 3 is a block diagram depicting a configuration example of a wireless communication apparatus (station) to which the present technology is applied.

FIG. 3 is a block diagram depicting a configuration example of a wireless communication apparatus 301 to which the present technology is applied. In FIG. 3, the components corresponding to those of the wireless communication apparatus 201 in FIG. 2 are designated by like reference numerals, and explanation of the corresponding components is omitted hereunder where appropriate.

The wireless communication apparatus 301 functions as a station that communicates wirelessly with access points.

The wireless communication apparatus 301 includes a communication module 311 and a data processing section 312.

The communication module 311 communicates wirelessly with access points.

The data processing section 312 extracts various kinds of information from signals supplied from the communication module 311. The data processing section 312 sends the extracted information and generated information to the communication module 311.

Compared with the communication module 211 in FIG. 2, the communication module 311 includes a wireless communication module 321 in place of the wireless communication module 122.

The wireless communication module 321 includes a semiconductor chip, for example. While exchanging information with the data processing section 312 as needed, the wireless communication module 321 sends various signals to the antenna 121 to have the signals transmitted from the antenna 121, and performs the processes corresponding to the signals received by the antenna 121.

Compared with the wireless communication module 122 in FIG. 1, the wireless communication module 321 includes a control section 331 in place of the control section 132.

The control section 331 controls the operation of the wireless communication module 321 as a whole. For example, the control section 331 supplies the data processing section 312 with the signal sent from the communication section 131, and supplies the communication section 131 with the information sent from the data processing section 312. In another example, the control section 331 controls the communication section 131 (RF transmission section 147 therein) to regulate the intensity of signals transmitted from the antenna 121. In a further example, the control section 331 selects the access point to which the wireless communication apparatus 301 is connected.

<Process at the Time of Connection of Access Point>

Figure 4:
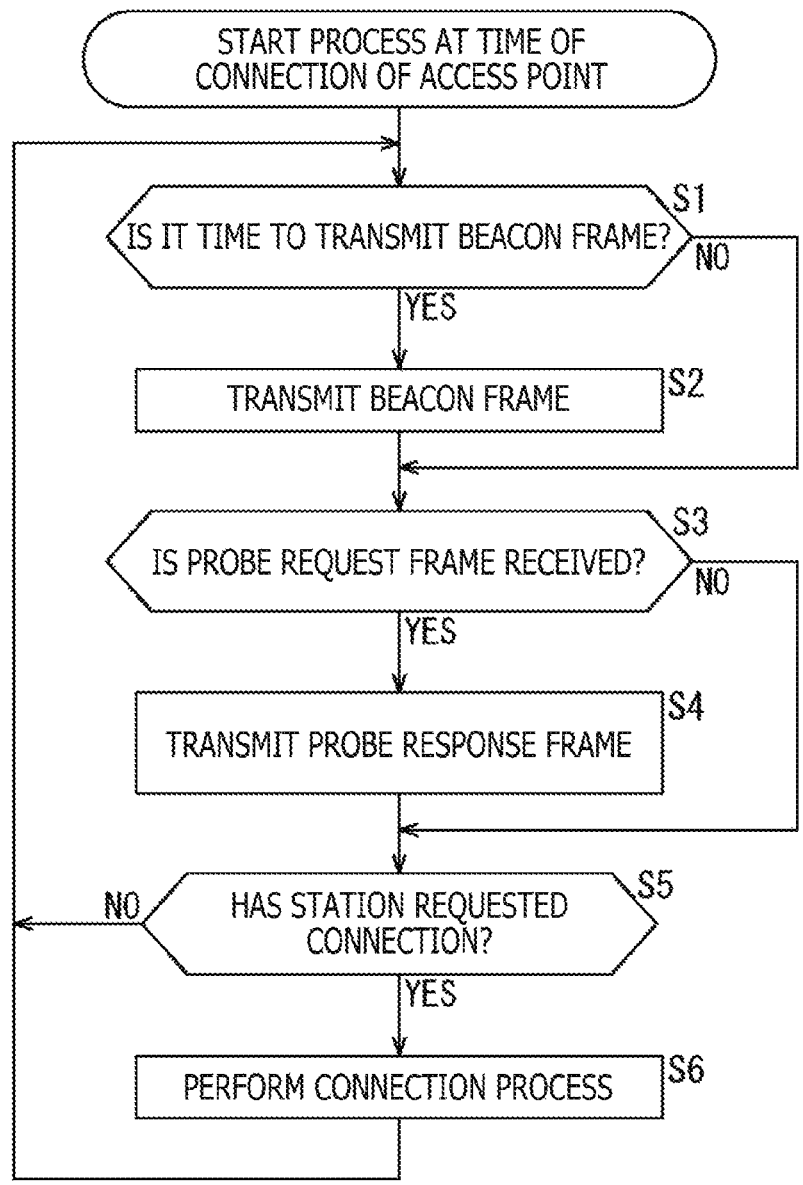
FIG. 4 is a flowchart explaining a process at the time of connection of an access point.
Figure 5:
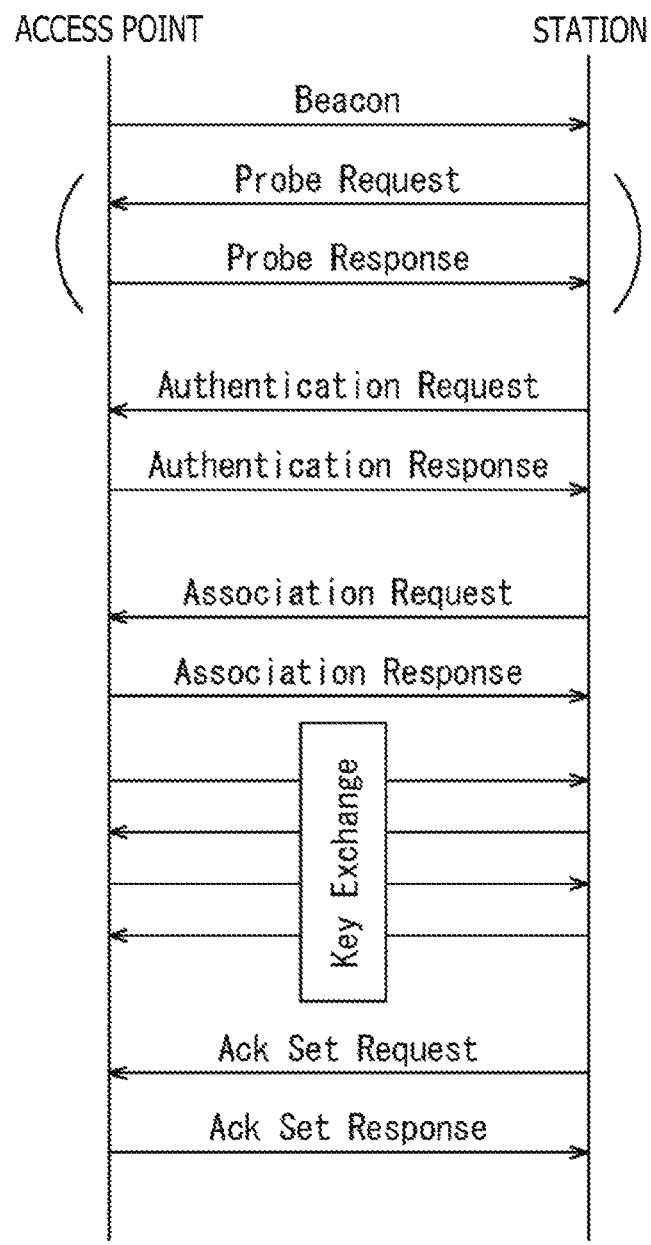
FIG. 5 is a sequence chart depicting a first protocol example at the time of connection between an access point and a station.

Explained next with reference to the flowchart in FIG. 4 and the sequence chart in FIG. 5 is a process performed when an access point (the wireless communication apparatus 101 in FIG. 1 or the wireless communication apparatus 201 in FIG. 2) connects to a station (the wireless communication apparatus 301 in FIG. 3).

In step S1, the control section 132 determines whether or not it is time to transmit a Beacon frame. For example, each access point transmits a Beacon frame as a broadcast signal periodically at predetermined intervals. In the case where the control section 132 determines that it is time to transmit a Beacon frame, the process is transferred to step S2.

In step S2, the access point transmits the Beacon frame.

Specifically, the control section 132 supplies the signal generation section 145 with information to be stored in each field in the Beacon frame, and orders the signal generation section 145 to generate the Beacon frame.

On the basis of the information supplied from the control section 132, the signal generation section 145 generates the Beacon frame. The signal generation section 145 sends the generated Beacon frame to the RF transmission section 147 via the analog signal conversion section 146.

The RF transmission section 147 transmits the Beacon frame via the antenna sharing section 141 and the antenna 121.

Thereafter, the process is transferred to step S3.

Figure 6:
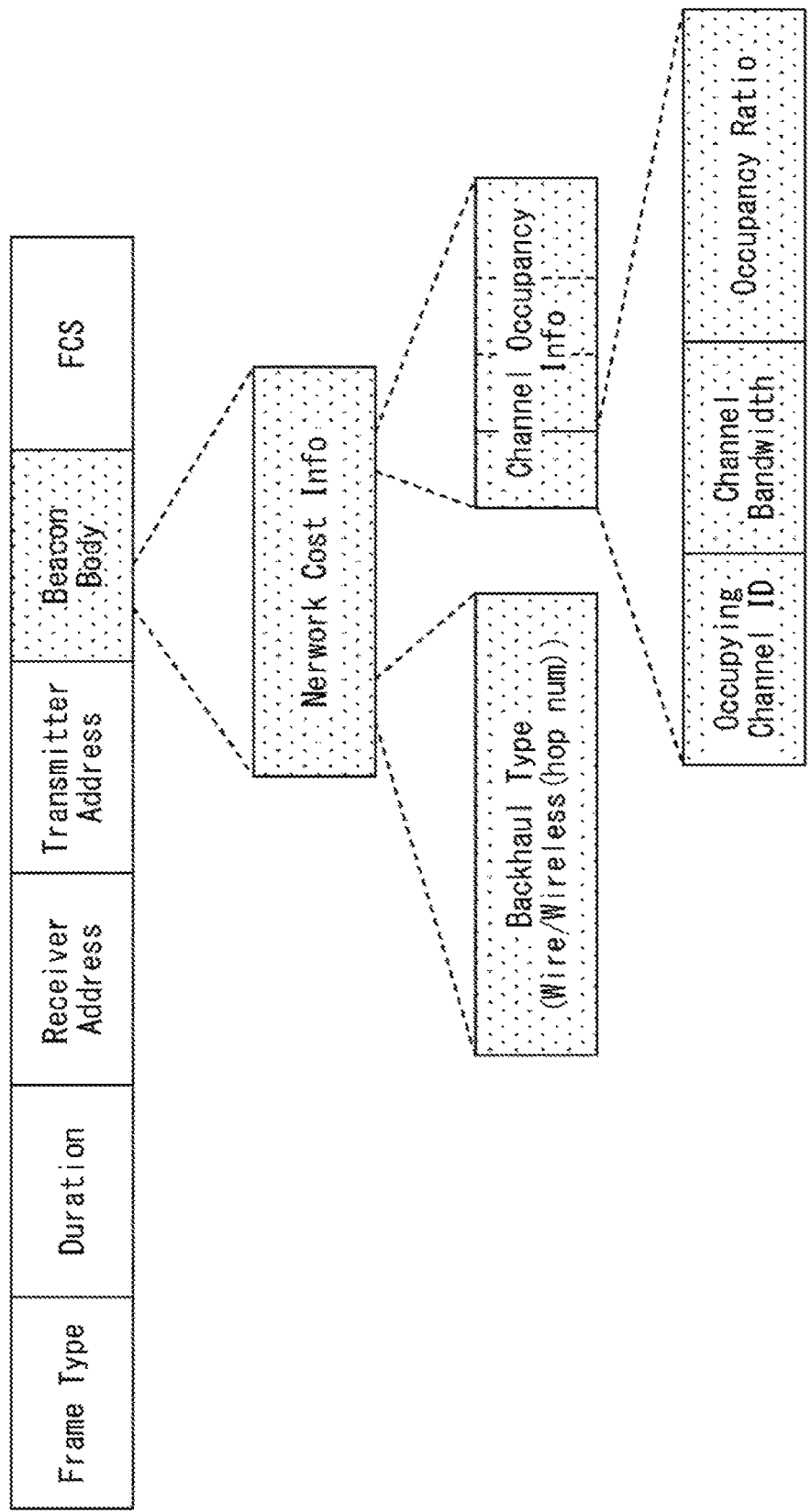
FIG. 6 is a view depicting an example of a beacon frame format.

FIG. 6 depicts an example of a Beacon frame format.

The Beacon frame includes a Frame Type field, a Duration field, a Receiver Address field, a Transmitter Address field, a Beacon body field, and an FCS (Frame Check Sequence) field.

The Frame Type field includes a field in which information indicative of the type of the frame is set. The information indicative of the Beacon frame is set in this field.

The Duration field includes a field in which information indicative of the duration of a frame transmission period is set.

The Receiver Address field includes a field in which the address of another access point or another station that receives a frame (e.g., MAC address) is set. Since the Beacon frame is broadcast without specifying a receiver, a broadcast address is set in this field.

The Transmitter Address field includes a field in which the address of the access point or the station (e.g., MAC address) that transmits the frame is set. The address of the access point acting as the transmitter of the beacon frame is set in this field.

The Beacon body field includes a field in which diverse information transmitted by the Beacon frame is set. For example, the Beacon body field includes Network Cost Info, which is network connection information regarding the wireless communication system.

The Network Cost Info includes information regarding frequency resources (media) of the access point. For example, the Network Cost Info includes a Backhaul Type and Channel Occupancy Info.

The Backhaul Type is information indicative of the state of connection of the access point to the backhaul (backhaul connection information). The Backhaul Type includes the type of the backhaul and the number of hops (hop num) for the access point.

The type of the backhaul is set to either Wire or Wireless. Specifically, in the case where the access point is connected to a wired backhaul, i.e., where the access point is a direct access point, the type of the backhaul is set to Wire. In the case where the access point is connected to a wireless backhaul, i.e., where the access point is an indirect access point, the type of the backhaul is set to Wireless.

The number of hops indicates the number of access points to pass through before the wired backhaul is connected. For example, the number of hops for the direct access point is set to 0. On the other hand, the indirect access point is connected to the wired backhaul by passing through other access points as described above. The number of access points to pass through before the wired backhaul is connected is set to the number of hops. The number of hops does not include the starting access point (i.e., access point for which the number of hops is set) but includes the access point connected to the wired backhaul (direct access point).

The Channel Occupancy Info includes information indicating the state of use of media (frequency resources) available for the access point with regard to each sub-channel. Specifically, the Channel Occupancy Info regarding each sub-channel includes an Occupying Channel ID, a Channel Bandwidth, and an Occupancy Ratio.

The Occupying Channel ID is an ID that identifies each sub-channel.

The Channel Bandwidth indicates the bandwidth of the frequency available for i.e., allocated to the sub-channels.

If the Occupying Channel ID includes information indicative of the bandwidth of the frequency available for the sub-channels, the Channel Bandwidth may be omitted.

The Occupancy Ratio indicates the ratio at which each sub-channel has been used. For example, the Occupancy Ratio indicates the ratio of the time in which each sub-channel has been actually used (time in which signal transmission and reception have been performed using the sub-channel) with respect to an immediately preceding predetermined time period.

Figure 7:
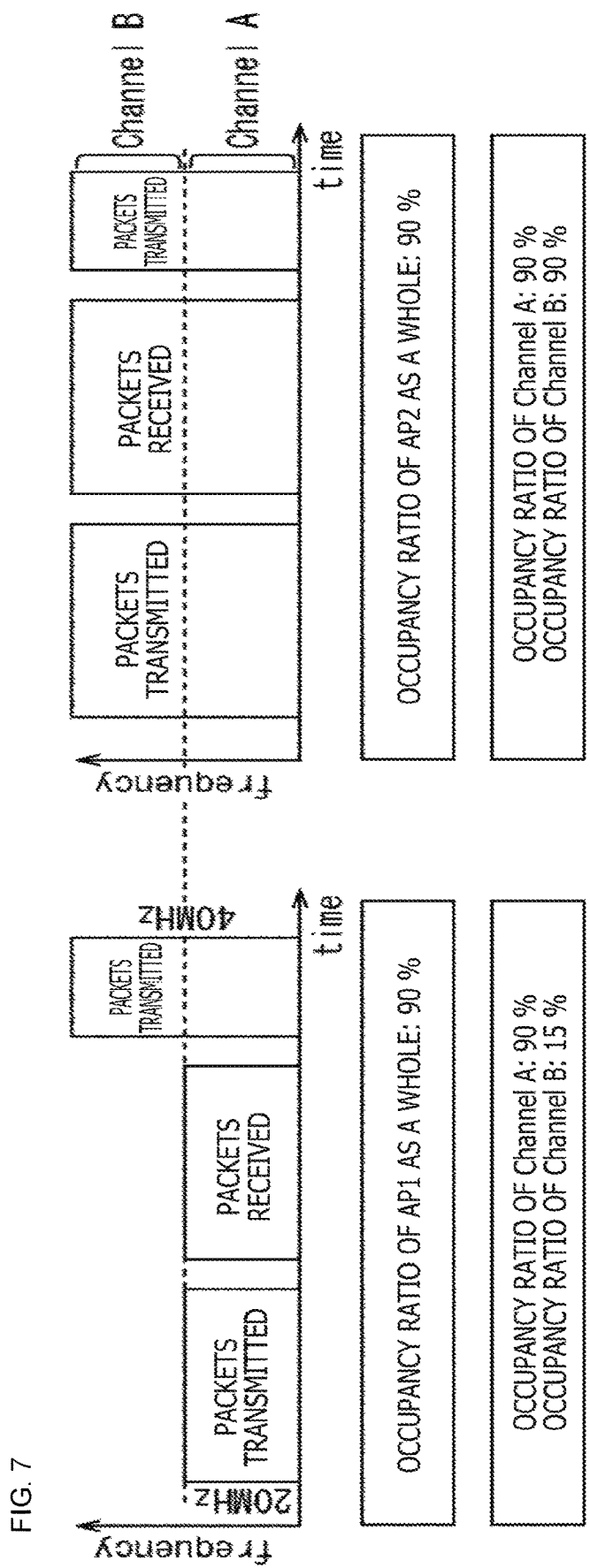
FIG. 7 is a view depicting an example of occupancy ratios of access points.

FIG. 7 depicts an example of Occupancy Ratios of access points and sub-channels. Specifically, the left part of FIG. 7 indicates Occupancy Ratios of an access point AP1, and the right part of FIG. 7 depicts Occupancy Ratios of an access point AP2. In each of the graphic representations, the horizontal axis stands for time and the vertical axis for frequency.

In this example, the bandwidth of the frequency available for the access points AP1 and AP2 is 40 MHz. The bandwidth is bisected into channels A and B with a bandwidth of 20 MHz each.

A technology called Channel Bending (also called Channel Aggregation) is applied to the access points AP1 and AP2. That is, the channels A and B may each be used singly, or the two sub-channels may be used in combination.

At the access point AP1, the channel A alone is first used to transmit and receive packets before the channels A and B are combined to transmit packets.

At the access point AP2, the channels A and B are combined to transmit, receive, and transmit packets, in that order.

At each of the access points, the Occupancy Ratio is 90% when viewed solely in the time axis direction. On the other hand, when viewed not only in the time axis direction but also in the frequency direction, i.e., when viewed for each of the sub-channels, the Occupancy Ratio is 90% for the channel A, and the Occupancy Ratio is 15% for the channel B at the access point AP1. By contrast, the Occupancy Ratio is 90% for both the channel A and the channel B at the access point AP1.

When the Occupancy Ratio is viewed for each sub-channel in this manner, the frequency resources of each access point are efficiently utilized. In the above example, the Occupancy Ratio for the channel B at the access point A is found to be low, so that the channel B has capacity to spare (surplus capacity). Thus, the unoccupied time of the channel B at the access point A may be utilized profitably as spare frequency resources to increase the transmission amount of signals, boost the transmission rate of signals, and improve communication quality.

Returning to FIG. 6, the FCS field includes a field in which a Frame Check Sequence is set.

Returning further to FIG. 4, in the case where it is determined in step S1 that it is not time to transmit a Beacon frame, the processing of step S2 is skipped and transferred to step S3.

In step S3, the control section 132 determines whether or not a Probe Request frame is received.

Figure 8:
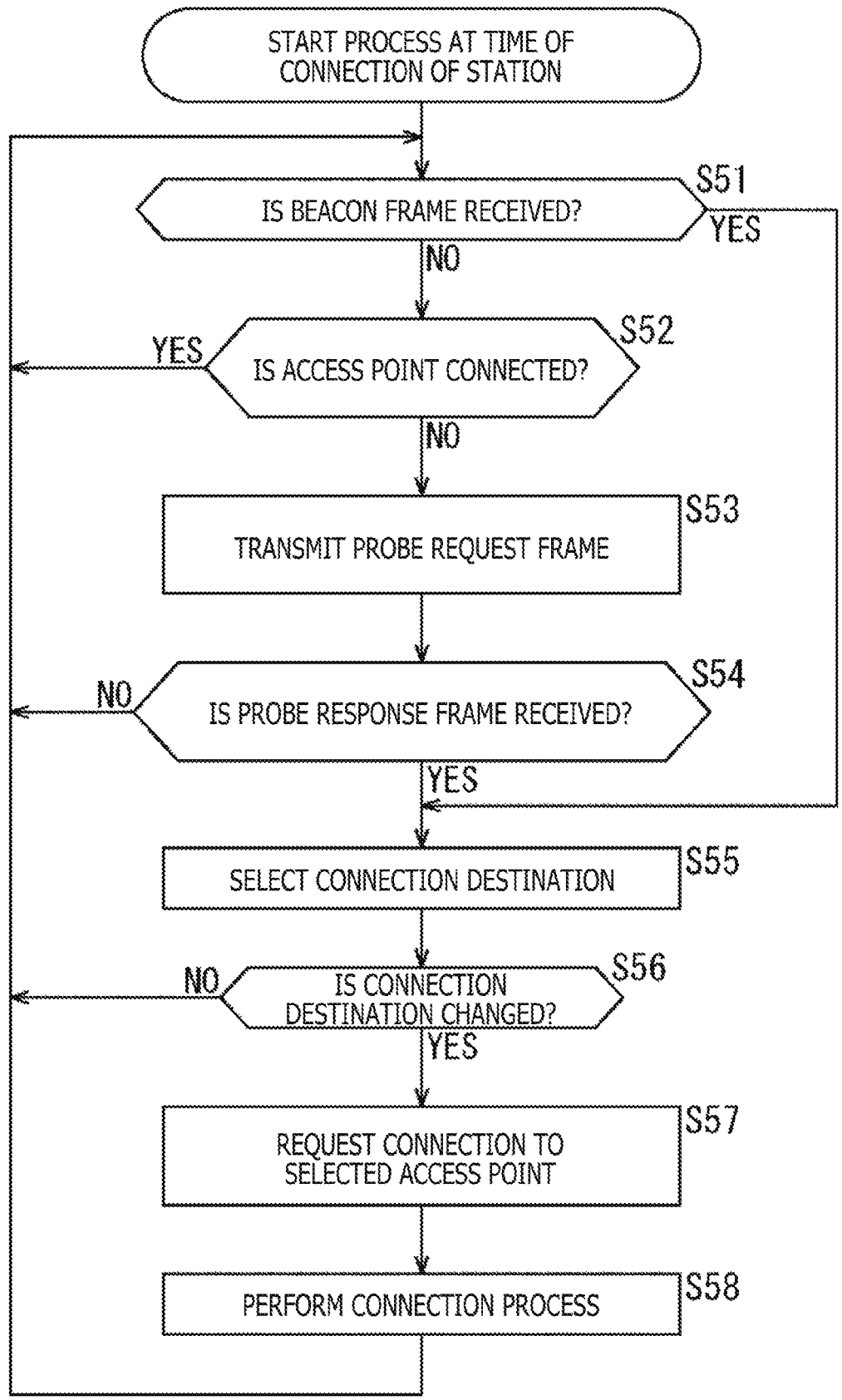
FIG. 8 is a flowchart explaining a process at the time of connection of the station.

For example, in the case where a Probe Request frame transmitted from the station in step S53 of FIG. 8, to be described later, is received via the antenna 121 and the antenna sharing section 141, the RF reception section 142 sends the received Probe Request frame to the control section 132 via the digital signal conversion section 143 and the signal reception section 144. This allows the control section 132 to determine that the Probe Request frame is received. The process is then transferred to step S4.

In step S4, the access point transmits a Probe Response frame. Specifically, the control section 132 supplies the signal generation section 145 with the information to be stored in each field of the Probe Response frame, and orders the signal generation section 145 to generate the Probe Response frame.

On the basis of the information supplied from the control section 132, the signal generation section 145 generates the Probe Response frame, and sends the generated Probe Response frame to the RF transmission section 147 via the analog signal conversion section 146.

The Probe Response frame includes at least the Network Cost Info depicted in FIG. 6. The Receiver Address field is set with the address of the station that transmits the Probe Request frame.

The RF transmission section 147 transmits the Probe Response signal as a broadcast signal via the antenna sharing section 141 and the antenna 121.

Thereafter, the process is transferred to step S5.

Meanwhile, in the case where it is determined in step S3 that the Probe Request frame is not received, the processing of step S4 is skipped. The process is then transferred to step S5.

In step S5, the control section 132 determines whether or not the station has requested connection. In the case where it is determined that the station has not requested connection, the process is returned to step S1.

Thereafter, the processing of steps S1 to S5 is repeated until it is determined in step S5 that the station has requested connection.

On the other hand, in the case where an Authentication Request frame transmitted from the station in step S57 of FIG. 8, to be described later, is received via the antenna 121 and the antenna sharing section 141, the RF reception section 142 sends the received Authentication Request frame to the control section 132 via the digital signal conversion section 143 and the signal reception section 144. This allows the control section 132 to determine that the station has requested connection. The process is then transferred to step S6.

In step S6, the access point performs a connection process.

Although not explained here in detail, the access point performs a connection process with the station that has requested connection in accordance with a protocol depicted in FIG. 5.

First, upon receipt of the Authentication Request frame, the access point transmits an Authentication Response frame to the station.

The access point then receives an Association Request frame from the station. In response to this, the access point transmits an Association Response frame to the station.

Next, the access point exchanges encryption keys with the station.

The access point then receives an Ack Set Request frame from the station. In response to this, the access point transmits an Ack Set Response frame to the station.

In this manner, the access point establishes connection with the station. The access point then starts exchanging data with the station.

Thereafter, the process is returned to step S1 and the subsequent processes are repeated.

<Process at the Time of Connection of Station>

Explained next with reference to the flowchart in FIG. 8 and the sequence chart in FIG. 5 is a process performed by the station upon connecting to the access point, the process taking place in conjunction with the process of the access point in FIG. 4.

In step S51, the control section 331 determines whether or not a Beacon frame is received. In the case where it is determined that the Beacon frame is not received, the process is transferred to step S52.

In step S52, the control section 331 determines whether or not an access point is connected. In the case where it is determined that the access point is connected, the process is returned to step S51.

Thereafter, the processing of steps S51 and S52 is repeated until the Beacon frame is determined to be received in step S51 or until the access point is determined to be not connected in step S52.

On the other hand, in the case where it is determined in step S52 that no access point is connected, the process is transferred to step S53. This, for example, is a case where the station is not connected with any access point and needs to search for a connectable access point because no Beacon frame has been received.

In step S53, the station transmits a Probe Request frame.

Specifically, the control section 331 supplies the signal generation section 145 with the information to be stored in each field of the Probe Request frame, and orders the signal generation section 145 to generate the Probe Request frame.

On the basis of the information supplied from the control section 331, the signal generation section 145 generates the Probe Request frame. The signal generation section 145 sends the generated Probe Request frame to the RF transmission section 147 via the analog signal conversion section 146.

Because the Probe Request frame is broadcast without specifying a receiver, a broadcast address is set to the receiver address.

The RF transmission section 147 transmits the Probe Request frame via the antenna sharing section 141 and the antenna 121.

In step S54, the station determines whether or not the Probe Response frame is received. In the case where it is determined that the Probe Response frame is not received, the process is returned to step S51.

Thereafter, the processing of steps S51 to S54 is repeated until the Beacon frame is determined to be received in step S51 or until the Probe Response frame is determined to be received in step S54.

On the other hand, in the case where the Probe Response frame transmitted from the access point in the above-described step S4 in FIG. 4 is received via the antenna 121 and the antenna sharing section 141 in step S54, the RF reception section 142 sends the Probe Response frame to the control section 331 via the digital signal conversion section 143 and the signal reception section 144. This allows the control section 331 to determine that the Probe Response frame is received. The process is then transferred to step S55.

At this time, there may be a case where the station receives Probe Response frames from a plurality of access points.

In the case where the Beacon frame transmitted from the access point in the above-described step S2 in FIG. 4 is received via the antenna 121 and the antenna sharing section 141 in step S51, the RF reception section 142 sends the received Beacon frame to the control section 331 via the digital signal conversion section 143 and the signal reception section 144. This allows the control section 331 to determine that the Beacon frame is received. The processing of step S52 to S54 is then skipped, and the process is transferred to step S55.

At this time, there may be a case where the station receives Beacon frames from a plurality of access points.

In step S55, the control section 331 selects a connection destination. Specifically, the control section 331 selects the connection destination from among connectable access points based on the Network Cost Info regarding each of these access points.

The connectable access points include the access point having transmitted the Beacon frame received in the processing of step S51 and the access point having transmitted the Probe Response frame received in the processing of step S54. In the case where the station is being connected with an access point, this connected access point is also included in the connectable access points.

For example, the control section 331 selects the connection destination from among the connectable access points in accordance with the following conditions.

(Condition 1)

In the case where there is only one connectable access point, this access point is selected as the connection destination.

(Condition 2)

In the case where there is a plurality of connectable access points, the connection destination is selected in accordance with the following Conditions 2.1 to 2.3.

(Condition 2.1)

In the case where the connectable access points include solely direct access points, the connection destination is selected in accordance with the following Conditions 2.1.1 to 2.1.2.

(Condition 2.1.1)

The direct access point with a lower Occupancy Ratio than the other direct points is preferentially selected as the connection destination. For example, the direct access point having the sub-channel with the lowest Occupancy Ratio is selected as the connection destination. In another example, the direct access point having the sub-channels with the lowest average Occupancy Ratio is selected as the connection destination.

(Condition 2.1.2)

In the case where there is a plurality of direct access points that correspond to Condition 2.1.1, the direct access point with higher reception intensity of the Beacon frame or of the Probe Response frame than the other direct access points is preferentially selected as the connection destination.

(Condition 2.2)

In the case where there are direct and indirect access points as connectable access points, the connection destination is selected in accordance with the following Conditions 2.2.1 and 2.2.2.

(Condition 2.2.1)

A direct access point is preferentially selected over the indirect access points as the connection destination.

(Condition 2.2.2)

In the case where there is a plurality of connectable direct access points, the connection destination is selected in accordance with the above-stated Conditions 2.1.1 and 2.1.2.

(Condition 2.3)

In the case where the connectable access points include solely direct access points, the connection destination is selected in accordance with the following Conditions 2.3.1 to 2.3.3.

(Condition 2.3.1)

The indirect access point with a smaller number of hops than the other indirect access points is preferentially selected as the connection destination.

(Condition 2.3.2)

In the case where there is a plurality of indirect access points that correspond to the above-stated Condition 2.3.1, the indirect access point with a lower Occupancy Ratio than the other indirect access points is preferentially selected as the connection destination. For example, the indirect access point having the sub-channel with the lowest Occupancy Ratio is selected as the connection destination. In another example, the indirect access point having the sub-channels with the lowest average Occupancy Ratio is selected as the indirect access point.

(Condition 2.3.3)

In the case where there is a plurality of indirect access points that correspond to the above-stated Condition 2.3.2, the indirect access point with higher reception intensity of the Beacon Frame or of the Probe Response frame than the other indirect access points is preferentially selected as the connection destination.

In step S56, the control section 331 determines whether or not the connection destination is changed. In the case where an access point is being connected and where the currently connected access point coincides with the access point selected in the processing of step S55, the control section 331 determines that the connection destination remains unchanged. The process is then returned to step S51.

Thereafter, the processing of steps S51 to S56 is repeated until it is determined in step S56 that the connection destination is changed.

On the other hand, in the case where an access point is being connected and where the currently connected access point does not coincide with the access point selected in the processing of step S55, the control section 331 determines that the connection destination is changed. The process is then transferred to step S57. In the case where no access point is currently connected, the control section 331 determines that the connection destination is changed. The process is then transferred to step S57.

In step S57, the station requests connection to the selected access point. Specifically, the control section 331 supplies the signal generation section 145 with the information to be stored in each field of the Authentication Request frame, and orders the signal generation section 145 to generate the Authentication Request frame.

On the basis of the information supplied from the control section 331, the signal generation section 145 generates the Authentication Request frame. The signal generation section 145 sends the generated Authentication Request frame to the RF transmission section 147 via the analog signal conversion section 146.

The address of the access point selected in the processing of step S55 is set to the receiver address of the Authentication Request frame.

The RF transmission section 147 transmits the Authentication Request frame to the selected access point via the antenna sharing section 141 and the antenna 121.

In step S58, the station performs a connection process.

Although not explained here in detail, the station performs a connection process with the access point that is the connection destination in accordance with the protocol depicted in FIG. 5.

First, the station receives from the access point an Authentication Response frame in response to the Authentication Request frame transmitted thereto.

The station then transmits an Association Request frame to the access point. In return, the station receives an Association Response frame from the access point.

Next, the station exchanges encryption keys with the access point.

The station then transmits an Ack Set Request frame to the access point. In return, the station receives an Ack Set Response frame from the access point.

In this manner, the station establishes connection with the access point. The station then starts exchanging data with the access point.

Thereafter, the process is returned to step S51, and the subsequent processes are repeated.

Explained hereunder with reference to FIGS. 9A, 9B, 10A, 10B, and 11 is a specific example of the method for selecting the connection destination for the station.

FIGS. 9A, 9B, 10A, and 10B depict a typical wireless communication system that includes access points AP1 to AP3. The access points AP1 to AP3 are arranged in rooms 401a to 401c, respectively. It is assumed that the access points AP1 to AP3 are either all access points or all indirect access points. It is further assumed that the bandwidth of frequencies available for the access points AP1 to AP3, their number of sub-channels, and their transmission intensity of signals are all the same.

The room 401a has a doorway 402a. There is a doorway 402b between the room 401a and the room 401b. There is a doorway 402c between the room 401a and the room 401c.

Figure 9A:
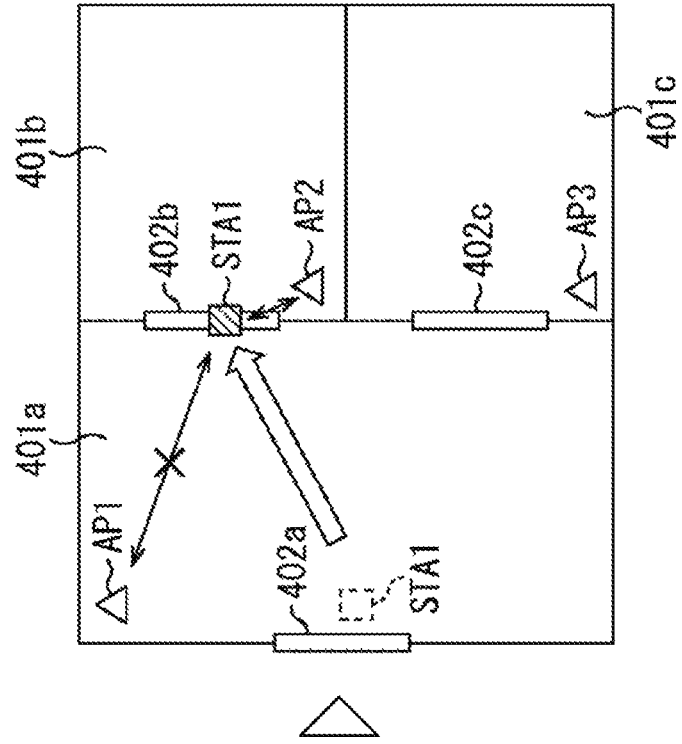
FIGS. 9A and 9B are views explaining a method of selecting a connection destination for the station.

For example, as depicted in FIG. 9A, in the case where a station STA1 is near the doorway 402a, the access point AP1 is closest to the station STA1, so that the intensity of reception from the access point AP1 is highest for the station STA1. Thus, the station STA1 selects the access point AP1 as the connection destination.

Figure 9B:
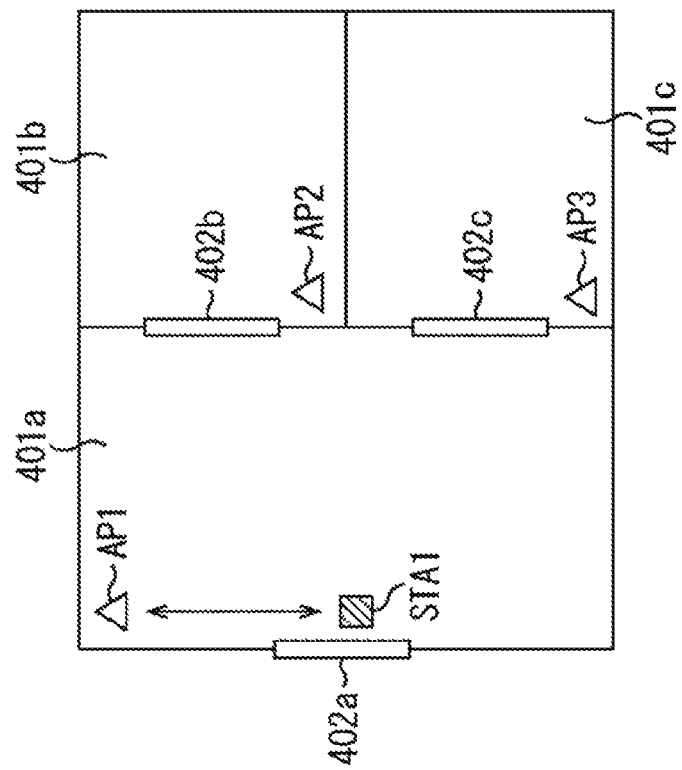

Thereafter, as depicted in FIG. 9B, in the case where the station STA1 moves close to the doorway 402b, the access point AP2 is closest to the station STA1, so that the intensity of reception from the access point AP2 is thus highest for the station STA1. As a result, the station STA1 changes the connection destination from the access point AP1 to the access point AP2. This shortens the transmission distance between the station STA1 and the access point that is the connection destination, which improves a communication rate and communication quality therebetween.

Figure 10A:
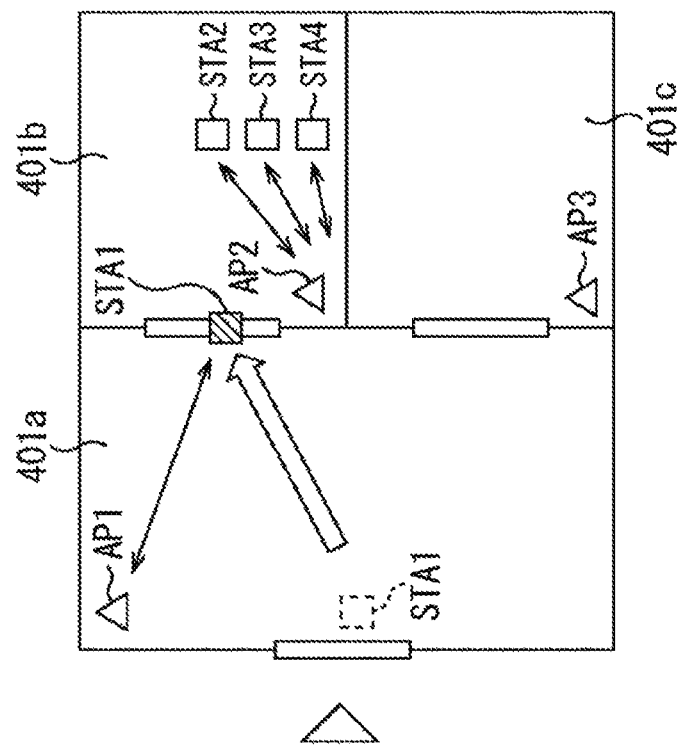
FIGS. 10A and 10B are views explaining another method of selecting a connection destination for the station.

Meanwhile, as depicted in FIG. 10A, in the case where the station STA1 is near the doorway 402a, the station STA1 selects the access point AP1 as the connection destination, as in the example in FIG. 9A.

Figure 10B:
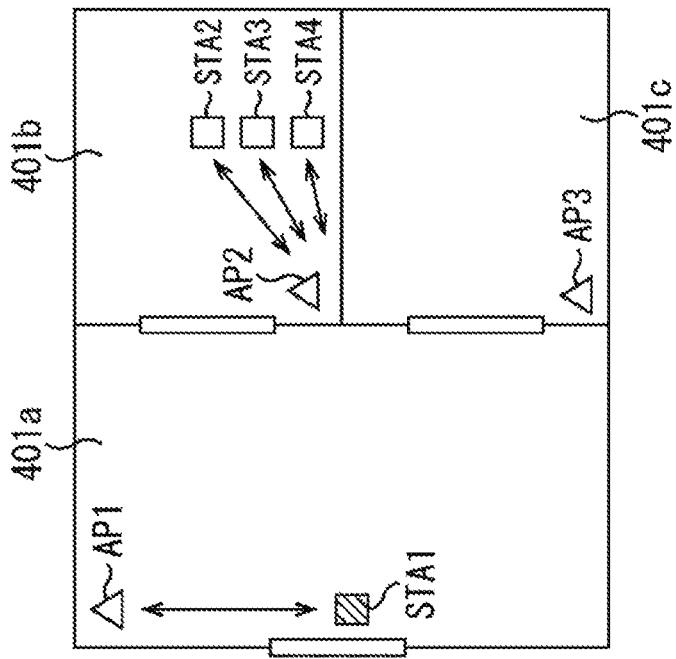

Thereafter, as depicted in FIG. 10B, in the case where the station STA1 moves close to the doorway 402b as in the example in FIG. 9B, the intensity of reception from the access point AP2 is highest for the station STA1. However, the access point AP2 is under high load because it is already connected with stations STA2 to STA4. That means the Occupancy Ratio of the access point AP2 is higher than that of the access point AP1. As a result, the station STA1 does not change the connection destination and continues to be connected with the access point AP1. This prevents the station STA1 from connecting with the access point AP2 under high load, thereby preventing drops in communication rate and communication quality.

Figure 11:
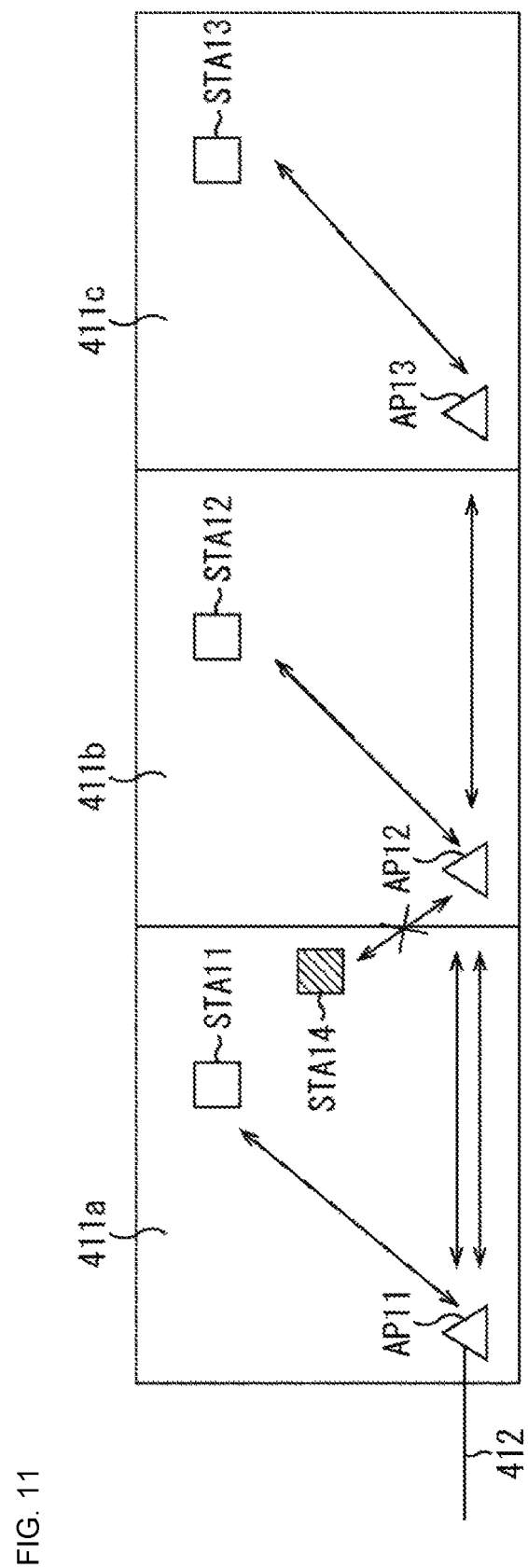
FIG. 11 is a view explaining another method of selecting a connection destination for the station.

FIG. 11 depicts a typical wireless communication system that includes access points AP11 to AP13. The access points AP11 to AP13 are arranged in rooms 411a to 411c, respectively.

The access point AP11 is a direct access point connected directly to a wired backhaul 412. The number of hops for the access point AP11 is 0.

The access point AP12 is an indirect access point connected to the wired backhaul 412 via the access point AP11. The number of hops for the access point AP12 is 1.

The access point AP13 is an indirect access point connected to the wired backhaul 412 via the access points AP11 and AP12. The number of hops for the access point AP12 is 2.

It is assumed that the bandwidth of frequencies available for the access points AP11 to AP13, their number of subchannels, and their transmission intensity of signals are all the same.

A station STA11 is connected to the access point AP11.

A station STA12 is connected to the access point AP12 and connected to the access point AP11 via the access point AP12.

A station STA13 is connected to the access point AP13, to the access point AP12 via the access point AP13, and to the access point AP11 via the access point AP12.

In this manner, the access point AP11 is connected directly or indirectly with the stations STA11 to STA13. The access point AP12 is connected directly or indirectly with the stations STA12 and STA13. The access point AP13 is connected directly with the station STA13. The Occupancy Ratio of the access point AP11 is thus higher than that of the access point AP12, in turn, the Occupancy Ratio of the access point AP12 is higher than the Occupancy Ratio of the access point AP13.

It is assumed here that a station STA14 exists on the boundary between the room 411a and the room 411b and is connectable to the access points AP11 and AP12. In this case, the access point AP12 is closer to the station STA14 than the access point AP11, so that the intensity of reception from the access point AP12 is higher than from the access point AP11 for the station STA14. Further, as described above, the Occupancy Ratio of the access point AP12 is lower than that of the access point AP11.

In this case, the access point AP12 appears to be more appropriate than the access point AP11 as the connection destination for the station STA14. However, since the access point AP11 is a direct access point and the access point AP12 is an indirect access point, the station STA14 selects the access point AP11 as the connection destination.

Even if the station STA11 selects the access point AP12 as the connection destination, the station STA11 is eventually connected to the access point AP11 via the access point AP12. Thus, connecting the station STA11 directly to the access point AP11 without the intervention of the access point AP12 improves a communication rate and communication quality.

Even if the station STA12 is not connected to the access point AP12, the station STA14 selects the access point AP11 as the connection destination.

In this manner, the station can easily select the appropriate access point from among a plurality of access points on the basis of their Network Cost Info. As a result, the utilization efficiency of frequency resources is improved, for example, which leads to increased transmission amounts of signals, enhanced transmission rate of signals, and improvements in communication quality.

<Transmission Intensity Control Process>

Examples are described above in which the station selects the access point based on the Network Cost Info regarding configured access points. Alternatively, each of the access points may control the transmission intensity of the Beacon frame or of the Probe Response frame on the basis of the Network Cost Info regarding the access points, thereby adjusting the range of connectable stations.

Figure 12:
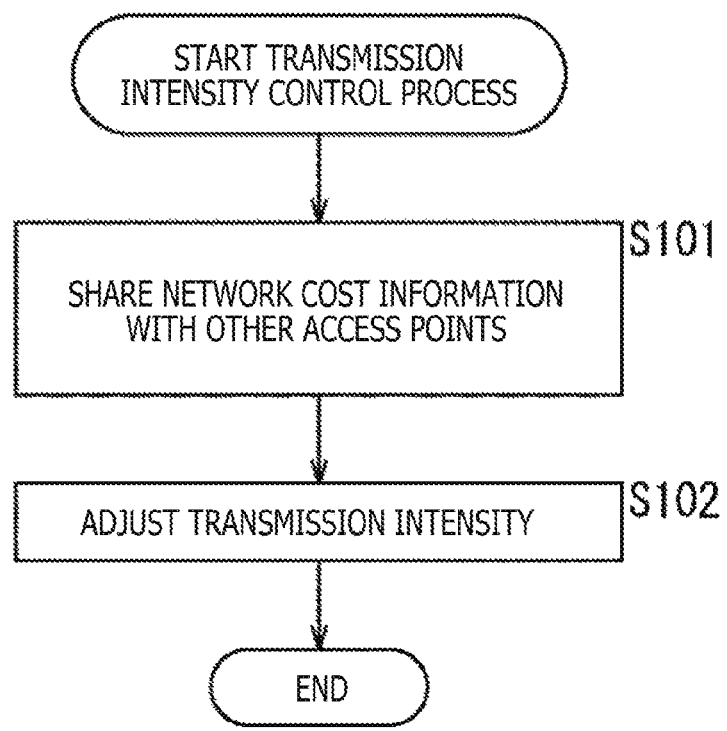
FIG. 12 is a flowchart explaining a transmission intensity control process.

Explained below with reference to the flowchart of FIG. 12 is a transmission intensity control process performed by an access point.

In step S101, the access point shares the Network Cost Info with other access points.

An example of the method for sharing the Network Cost Info between the access points is explained here.

For example, the control section 132 supplies the signal generation section 145 with the information to be stored in each field of an information sharing frame, and orders the signal generation section 145 to generate the information sharing frame.

The signal generation section 145 generates the information sharing frame based on the information supplied from the control section 132. The signal generation section 145 sends the generated information sharing frame to the RF transmission section 147 via the analog signal conversion section 146.

The information sharing frame includes at least the Network Cost Info depicted in FIG. 6. Because the information sharing frame is broadcast to other access points, a broadcast address is set to the receiver address of the frame.

The RF transmission section 147 transmits the information sharing frame via the antenna sharing section 141 and the antenna 121.

The RF reception section 142 further receives information sharing frames sent from other access points via the antenna 121 and the antenna sharing section 141. The RF reception section 142 sends the received information sharing frames to the control section 132 via the digital signal conversion section 143 and the signal reception section 144.

In this manner, communication is conducted between a plurality of access points so that the Network Cost Info regarding the access points may be shared therebetween.

The above-described method of sharing the Network Cost Info is only an example. Some other suitable method may be utilized alternatively for the sharing purpose.

In step S102, the control section 132 adjusts the intensity of transmission. For example, the control section 132 controls the RF transmission section 147 to adjust the transmission intensity of frames (e.g., Beacon frame, Probe Response frame) to transmit the Network Cost Info to the station. The transmission intensity is adjusted in accordance with Conditions 1 to 3 below and based on the state of connection to the backhaul and on the status of use of frequency resources.

(Condition 1)

In the case where a wired backhaul is connected, the transmission intensity is made higher than the case where a wireless backhaul is connected.

(Condition 2)

The smaller the number of hops, the higher the transmission intensity is made.

(Condition 3)

The lower the Occupancy Ratio, the higher the transmission intensity is made. For example, each access point adjusts the transmission intensity in a manner satisfying Conditions 1 to 3 above in coordination with surrounding access points.

In this manner, the transmission intensity of a direct access point, for example, is made higher than that of an indirect access point. Between direct access points, for example, the transmission intensity of the direct access point with a higher Occupancy Ratio is made higher than that of the direct access point with a lower Occupancy Ratio. Between indirect access points, for example, the transmission intensity of the indirect access point with a smaller number of hops is made higher than that of the indirect access point with a larger number of hops. Between indirect access points each having the same number of hops, for example, the transmission intensity of the indirect access point with a lower Occupancy Ratio is made higher than that of the indirect access point with a higher Occupancy Ratio.

In another example, the lower limit of the transmission intensity may be determined in such a manner as to prevent each access point from getting disconnected from the currently connected station. This can bring about a case where none of Conditions 1 to 3 above is satisfied.

In this manner, the transmission intensity between access points is adjusted relative to one another.

In another example, each access point may, without coordinating with other access points, set its transmission intensity based on the state of connection to the backhaul and on the status of use of frequency resources. For instance, each access point may set its transmission intensity based on the type of the connected backhaul, on the number of hops, and on the Occupancy Ratio and in a manner satisfying Conditions 1 to 3 above using predetermined functions.

2. Modified Examples

Some modified examples of the above-described embodiment of the present technology are explained below.

Figure 13:
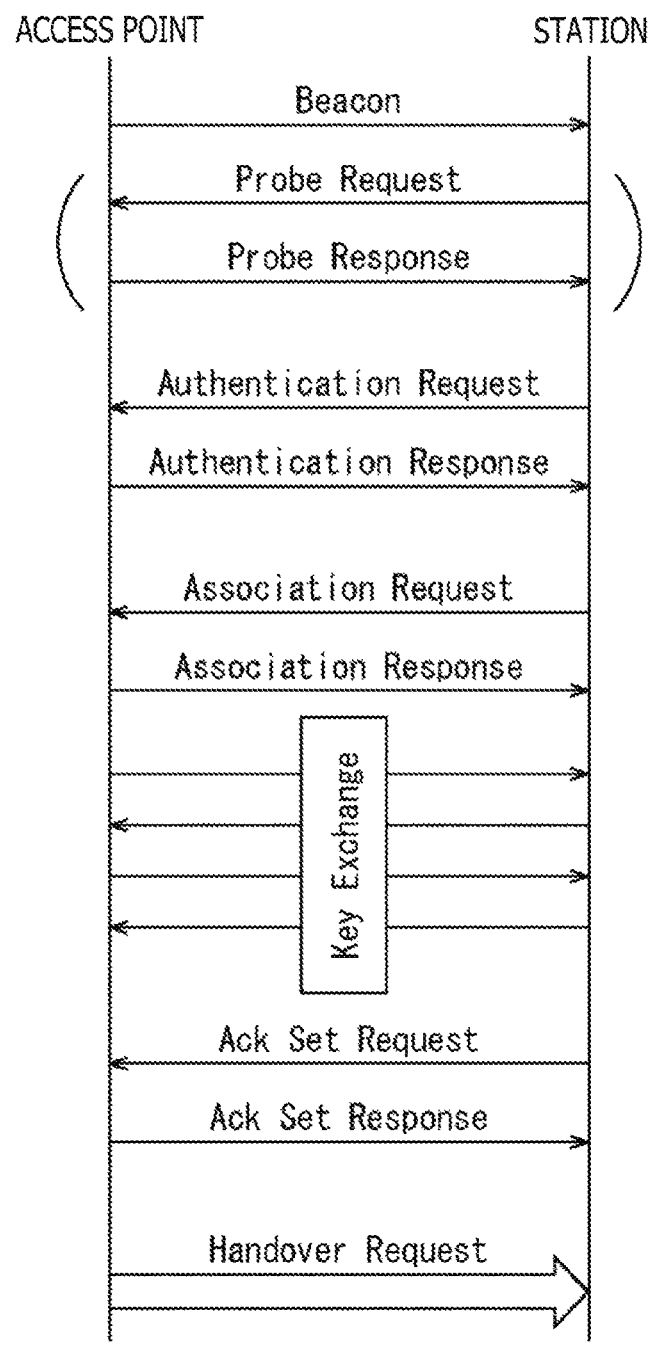
FIG. 13 is a sequence chart depicting a second protocol example at the time of connection between an access point and a station.

For example, as depicted in the sequence chart of FIG. 13, in the case where the access point fails to maintain its communication quality typically under a heavy load, the access point may request the station to change the connection destination. Specifically, after connection is established between the access point and the station in accordance with the protocol as described above with reference to FIG. 5, the access point may transmit a Handover Request frame to the station. In response to this, the station disconnects with the access point, searches for another access point, and connects to the newly-found access point.

This makes it possible to efficiently utilize the frequency resources between the access point and the station so as to improve communication quality therebetween. In this case, however, another connection process needs to be carried out between the station and the new access point. According to the above-described method, the station performs the connection process after selecting the connection destination based on the Network Cost Info. This enables the station to connect with the appropriate access point more quickly.

Examples are described above in which the wireless communication module 122 (FIG. 1) and the wired communication module 123 (FIG. 1) are each configured with a semiconductor chip. In another example, the communication module 111 (FIG. 1), the communication module 211 (FIG. 2), and the communication module 311 (FIG. 3) may each be configured with a semiconductor chip as well.

Examples are also described above in which the access point transmits the Network Cost Info using the Beacon frame or the Probe Request frame. Alternatively, the Network Cost Info may be transmitted by use of some other suitable broadcast signal.

In addition to the above-described communication in accordance with the IEEE 802.11 standard, the present technology may be applied to all communications based on methods by which a wireless terminal station selects the connection destination from among a plurality of wireless base stations to communicate with the selected connection destination.

3. Others

<Typical Configuration of Computer>

The series of processing described above may be executed either by hardware or by software. In the case where the series of processing is to be carried out by software, the programs constituting the software are installed into a suitable computer. Variations of the computer include one with the software installed beforehand in its dedicated hardware, and a general-purpose personal computer or like equipment capable of executing diverse functions based on the programs installed therein.

Figure 14:
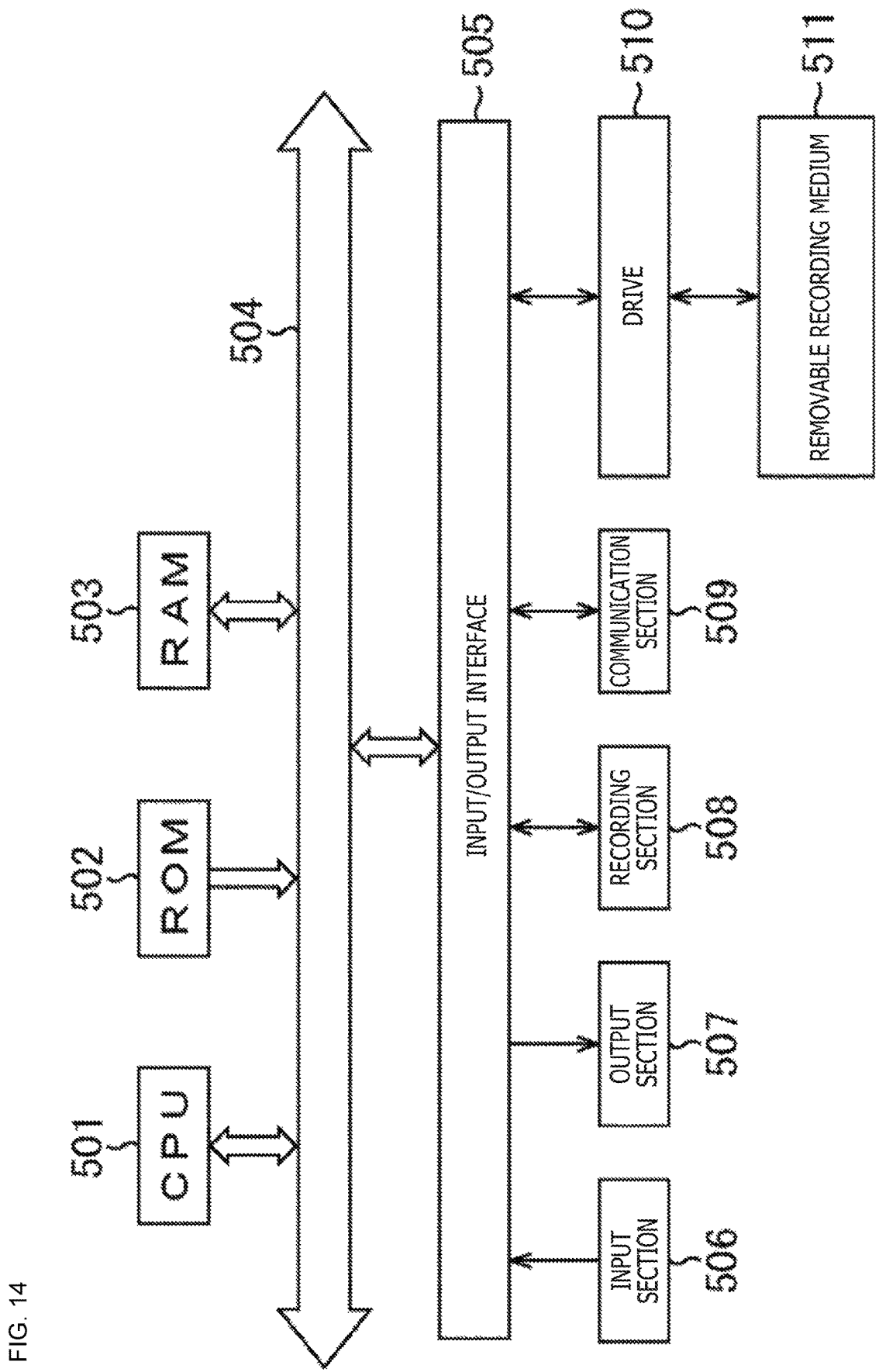
FIG. 14 is a view depicting a configuration example of a computer.

FIG. 14 is a block diagram depicting a hardware configuration example of a computer that executes the above-described series of processing using programs.

In a computer 500, a CPU (Central Processing Unit) 501, a ROM (Read Only Memory) 502, and a RAM (Random Access Memory) 503 are interconnected via a bus 504.

The bus 504 is further connected with an input/output interface 505. The input/output interface 505 is connected with an input section 506, an output section 507, a recording section 508, a communication section 509, and a drive 510.

The input section 506 is typically configured with input switches, buttons, a microphone, and an imaging element. The output section 507 is typically configured with a display unit and speakers. The recording section 508 is typically configured with a hard disk and a nonvolatile memory. The communication section 509 is typically configured with a network interface. The drive 510 drives removable recording media 511 such as a magnetic disk, an optical disk, a magneto-optical disk, or a semiconductor memory.

In the computer 500 configured as described above, the CPU 501 may perform the above-mentioned series of processing typically by loading appropriate programs from the recording section 508 into the RAM 503 via the input/output interface 505 and the bus 504 and by executing the loaded programs.

The programs to be executed by the computer 500 (CPU 501) may be recorded, for example, on the removable recording media 511 as packaged media when offered. The programs may be offered alternatively via wired or wireless transmission media such as local area networks, the Internet, and digital satellite broadcasting.

In the computer 500, the programs may be installed into the recording section 508 from the removable recording media 511 attached to the drive 510 via the input/output interface 505. The programs may also be installed into the recording section 508 after being received by the communication section 509 via wired or wireless transmission media. The programs may alternatively be preinstalled in the ROM 502 or in the recording section 508.

The programs for execution by the computer may be carried out chronologically in the depicted sequence in this specification, in parallel, or on an as-needed basis such as when they are invoked.

In this description, the term "system" refers to an aggregate of a plurality of components (e.g., apparatuses or modules (parts)). It does not matter whether or not all components are housed in the same enclosure. Thus, a system may be configured with a plurality of apparatuses housed in separate enclosures and interconnected via a network, or with a single apparatus in a single enclosure that houses a plurality of modules.

Further, the present technology is not limited to the embodiments described above and may be implemented in diverse variations so far as they are within the scope of the technology.

For example, the present technology may be implemented as a cloud computing setup in which a single function is processed cooperatively by a plurality of networked apparatuses on a shared basis.

Also, each of the steps described in reference to the above-described flowcharts may be executed either by a single apparatus or by a plurality of apparatuses on a shared basis.

Furthermore, in the case where a single step includes a plurality of processes, these processes may be executed either by a single apparatus or by a plurality of apparatuses on a shared basis.

<Typical Combinations of Configured Components>

The present technology, when implemented, may be configured preferably as follows.

(1)

A wireless communication apparatus including:

a communication section configured to transmit to a wireless terminal station a broadcast signal including network connection information regarding a wireless communication system having a plurality of wireless base stations communicating with one another, in which the wireless communication apparatus functions as one of the plurality of wireless base stations.

(2)

The wireless communication apparatus according to (1), in which the network connection information includes backhaul connection information indicative of a state of connection to a backhaul.

(3)

The wireless communication apparatus according to (2), in which the backhaul connection information includes information indicative of whether the backhaul is a wired backhaul or a wireless backhaul.

(4)

The wireless communication apparatus according to (3), in which the backhaul connection information further includes the number of hops indicative of the number of wireless base stations to pass through before the wired backhaul is connected.

(5)

The wireless communication apparatus according to any one of (2) to (4), further including:

a control section configured to control transmission intensity of the broadcast signal based on the state of connection to the backhaul.

(6)

The wireless communication apparatus according to (5), in which the control section sets the transmission intensity of the broadcast signal higher in a case where a wired backhaul is connected than in a case where a wireless backhaul is connected.

(7)

The wireless communication apparatus according to (6), in which the smaller the number of wireless base stations to pass through before the wired backhaul is connected, the higher the control section sets the transmission intensity of the broadcast signal.

(8)

The wireless communication apparatus according to any one of (5) to (7), in which the control section further controls the transmission intensity of the broadcast signal based on the state of connection of a surrounding wireless base station to the backhaul.

(9)

The wireless communication apparatus according to any one of (1) to (8), in which the network connection information includes usage information indicative of a status of use of available frequency resources.

(10)

The wireless communication apparatus according to (9), in which the usage information indicates the status of use of the frequency resources for each of sub-channels.

(11)

The wireless communication apparatus according to (9) or (10), further including: a control section configured to control transmission intensity of the broadcast signal based on the status of use of the frequency resources.

(12)

The wireless communication apparatus according to (11), in which the lower an occupancy ratio of the frequency resources is, the higher the control section sets the transmission intensity of the broadcast signal.

(13)

The wireless communication apparatus according to (11) or (12), in which the control section further controls the transmission intensity of the broadcast signal based on a status of use of frequency resources for a surrounding wireless base station.

(14)

A wireless communication method for use with a wireless communication apparatus, the method including:

causing the wireless communication apparatus to transmit to a wireless terminal station a broadcast signal including network connection information regarding a wireless communication system having a plurality of wireless base stations communicating with one another; and allowing the wireless communication apparatus to function as one of the plurality of wireless base stations.

(15)

A wireless communication apparatus including:

a communication section configured to receive a broadcast signal including network connection information regarding a wireless communication system, from a plurality of wireless base stations constituting the wireless communication system and communicating with one another; in which the wireless communication apparatus functions as a wireless terminal station.

(16)

The wireless communication apparatus according to (15), further including:

a control section configured to select a connection destination from among the plurality of wireless base stations based on the network connection information.

(17)

The wireless communication apparatus according to (16), in which the network connection information includes backhaul connection information indicative of a state of connection of the wireless base stations to a backhaul, and the control section selects the connection destination based on the backhaul connection information.

(18)

The wireless communication apparatus according to (17), in which the backhaul connection information includes information indicative of whether the backhaul to which the wireless base station is connected is a wired backhaul or a wireless backhaul, and the control section preferentially selects as the connection destination the wireless base station connected to the wired backhaul over the wireless base station connected to the wireless backhaul.

(19)

The wireless communication apparatus according to (18), in which the backhaul connection information further includes the number of hops indicative of the number of other wireless base stations to pass through before the wireless base station is connected to the wired backhaul, and the control section selects the wireless base station with the smaller number of hops as the connection destination.

(20)

The wireless communication apparatus according to any one of (16) to (19), in which the network connection information further includes usage information indicative of a status of use of frequency resources available for the wireless base stations, and the control section selects as the connection destination the wireless base station with a lower occupancy ratio of the frequency resources.

The advantageous effects stated in this description are only examples and not limitative of the present technology that may also provide other advantages.

REFERENCE SIGNS LIST

101 Wireless communication apparatus, 102 Backhaul, 111 Communication module, 112 Data processing section, 121 Antenna, 122 Wireless communication module, 123 Wired communication module, 131 Communication section, 132 Control section, 142 RF reception section, 147 RF transmission section, 151 Communication section, 152 Control section, 201 Wireless communication apparatus, 211 Communication module, 301 Wireless communication apparatus, 311 Communication module, 312 Data processing section, 321 Wireless communication module, 331 Control section, AP1 to AP14 Access point, STA1 to STA14 Station

The invention claimed is:

1. A wireless communication apparatus, comprising:
a communication section configured to transmit, to a wireless terminal station, a broadcast signal that includes network connection information related to a wireless communication system, wherein
the wireless communication system has a plurality of wireless base stations that communicates with one another,
the network connection information includes usage information,
the usage information includes:
information indicative of a status of use of available frequency resources for each sub-channel, and
an occupancy ratio that indicates a ratio for the each sub-channel used, and
the wireless communication apparatus is configured to function as one of the plurality of wireless base stations.

2. The wireless communication apparatus according to claim 1, wherein the network connection information further includes backhaul connection information indicative of a state of connection to a backhaul.

3. The wireless communication apparatus according to claim 2, wherein the backhaul connection information further includes information indicative of whether the backhaul is one of a wired backhaul or a wireless backhaul.

4. The wireless communication apparatus according to claim 3, wherein the backhaul connection information further includes a number of hops indicative of a number of wireless base stations of the plurality of wireless base stations to pass through before the wired backhaul is connected.

5. The wireless communication apparatus according to claim 2, further comprising a control section configured to control transmission intensity of the broadcast signal based on the state of connection to the backhaul.

6. The wireless communication apparatus according to claim 5, wherein the control section is further configured to set the transmission intensity of the broadcast signal higher in a case where a wired backhaul is connected than in a case where a wireless backhaul is connected.

7. The wireless communication apparatus according to claim 6, wherein the transmission intensity of the broadcast signal is inversely proportional to a count of a number of wireless base stations of the plurality of wireless base stations to pass through before the wired backhaul is connected.

8. The wireless communication apparatus according to claim 5, wherein the control section is further configured to control the transmission intensity of the broadcast signal based on the state of connection of a surrounding wireless base station to the backhaul.

9. The wireless communication apparatus according to claim 1, further comprising a control section configured to control transmission intensity of the broadcast signal based on the status of use of the available frequency resources.

10. The wireless communication apparatus according to claim 9, wherein the transmission intensity of the broadcast signal is inversely proportional to the occupancy ratio of the available frequency resources.

11. The wireless communication apparatus according to claim 9, wherein the control section is further configured to control the transmission intensity of the broadcast signal based on the status of use of the available frequency resources for a surrounding wireless base station.

12. A wireless communication method, comprising:
causing a wireless communication apparatus to transmit, to a wireless terminal station, a broadcast signal that includes network connection information related to a wireless communication system, wherein
the wireless communication system has a plurality of wireless base stations communicating with one another,
the network connection information includes usage information, and
the usage information includes:
information indicative of a status of use of available frequency resources for each sub-channel, and
an occupancy ratio that indicates a ratio for the each sub-channel used; and
allowing the wireless communication apparatus to function as one of the plurality of wireless base stations.

13. A wireless communication apparatus, comprising:
a communication section configured to receive a broadcast signal that includes network connection information related to a wireless communication system, wherein
the wireless communication system comprises a plurality of wireless base stations that communicates with one another,
the network connection information includes usage information,
the usage information includes:
information indicative of a status of use of available frequency resources for each sub-channel, and an occupancy ratio that indicates a ratio for the each sub-channel used, and the wireless communication apparatus is configured to function as a wireless terminal station.

14. The wireless communication apparatus according to claim 13, further comprising a control section configured to select a connection destination from among the plurality of wireless base stations based on the network connection information.

15. The wireless communication apparatus according to claim 14, wherein the network connection information further includes backhaul connection information indicative of a state of connection of the plurality of wireless base stations to a backhaul, and the control section is further configured to select the connection destination based on the backhaul connection information.

16. The wireless communication apparatus according to claim 15, wherein the backhaul connection information further includes information indicative of whether the backhaul to which a wireless base station of the plurality of wireless base stations is connected is one of a wired backhaul or a wireless backhaul, and the control section is further configured to preferentially select, as the connection destination, a first wireless base station of the plurality of wireless base stations connected to the wired backhaul over a second wireless base station of the plurality of wireless base stations connected to the wireless backhaul.

17. The wireless communication apparatus according to claim 16, wherein the backhaul connection information further includes a number of hops indicative of a number of wireless base stations of the plurality of wireless base stations to pass through before the wireless base station is connected to the wired backhaul, and the control section is further configured to select, from among the plurality of wireless base stations, a specific wireless base station as the connection destination, and a count of the number of hops of the specific wireless base station is smaller than a threshold.

18. The wireless communication apparatus according to claim 14, wherein the control section is further configured to select, as the connection destination, a specific wireless base station of the plurality of wireless base stations with a lower occupancy ratio of the available frequency resources.

19. A wireless communication apparatus, comprising:

a communication section configured to transmit, to a wireless terminal station, a broadcast signal that includes network connection information associated with a wireless communication system, wherein the wireless communication system has a plurality of wireless base stations that communicates with one another, the network connection information includes backhaul connection information indicative of a state of connection to a backhaul, and the wireless communication apparatus is configured to function as one of the plurality of wireless base stations; and further comprises a control section configured to:

control transmission intensity of the broadcast signal based on the state of connection to the backhaul; and set the transmission intensity of the broadcast signal higher in a case where a wired backhaul is connected than in a case where a wireless backhaul is connected.

* * * * *